US008513905B2

(12) United States Patent
Julio

(10) Patent No.: US 8,513,905 B2
(45) Date of Patent: Aug. 20, 2013

(54) RANDOM ALGORITHMIC COLOR SELECTION FOR LIGHTING

(76) Inventor: Daniel John Julio, Boulder, CO (US)

( * ) Notice: Subject to any disclaimer, the term of this patent is extended or adjusted under 35 U.S.C. 154(b) by 359 days.

(21) Appl. No.: 12/747,873

(22) PCT Filed: Dec. 11, 2008

(86) PCT No.: PCT/US2008/086337

§ 371 (c)(1),
(2), (4) Date: Jun. 11, 2010

(87) PCT Pub. No.: WO2009/076493

PCT Pub. Date: Jun. 18, 2009

(65) Prior Publication Data

US 2010/0264852 A1 Oct. 21, 2010

Related U.S. Application Data

(60) Provisional application No. 61/013,355, filed on Dec. 13, 2007.

(51) Int. Cl.
*H04Q 9/02* (2006.01)
*H04L 12/16* (2006.01)

(52) U.S. Cl.
USPC ........................................ 315/312; 315/185 S

(58) Field of Classification Search
USPC ............... 315/312, 185 S, 291, 307, 308, 297
See application file for complete search history.

(56) References Cited

U.S. PATENT DOCUMENTS

| | | | | |
|---|---|---|---|---|
| 7,501,571 | B2 | 3/2009 | Forsman | |
| 7,550,931 | B2 * | 6/2009 | Lys et al. | 315/291 |
| 2004/0150994 | A1 | 8/2004 | Kazar | |

FOREIGN PATENT DOCUMENTS

| | | | |
|---|---|---|---|
| JP | 2000-166162 | | 6/2000 |
| JP | 2001-351788 | A | 12/2001 |
| KR | 10-2005-0077825 | | 8/2005 |

* cited by examiner

*Primary Examiner* — Daniel D Chang
(74) *Attorney, Agent, or Firm* — Patent Law Offices of Rick Martin, P.C.

(57) ABSTRACT

A method of using an algorithm to generate themed lighting selections suitable for use in holiday, themed, or party lighting. The algorithm using pseudo-random number generators to select values for a color-capable lighting system to generate animated scenes to fit a particular envisioned theme via defining parameters. Parameters to include such items as lists of light fixture selection within a zone, groups or single fixtures, also color selection from a list of color ranges, intensity selection, fade delay, and dwell delay. Lists and/or ranges can have an associated bias that is used to determine how probable it is to be selected.

15 Claims, 4 Drawing Sheets

RANDOM ALGORITHMIC COLOR SELECTION FOR LIGHTING

CROSS REFERENCE APPLICATIONS

This application is a non-provisional application claiming the benefits of provisional application No. 61/013,355 filed Dec. 13, 2007 and PCT application no. PCT/US2008/086337 filed Dec. 11, 2008.

FIELD OF INVENTION

The present invention relates to a method of using an algorithm to generate themed lighting selections suitable for use in holiday, themed, or party lighting. More specifically, the algorithm uses pseudo-random number generators to select values for a color-capable lighting system (for example, LEDs) to generate animated scenes to fit a particular envisioned theme via defining parameters such as light fixture selection, color selection, color ranges, intensity, fade delay, and dwell delay.

BACKGROUND

Until only a few years ago, LEDs were capable only of emitting red and green light, making their use fairly restricted for most users. With new research, the creation of blue LED lights allow a full spectrum of colors, which has become particularly useful for themed layouts in concerts, window displays, stage settings, and other theme-oriented displays. Themed lighting arrangements using color LEDs will further expand color light usage in the home, workshop and the like.

The color value of a light beam may be specified using a three-dimensional HSV or HSI color tree (color space), as shown in FIG. 1. The tree represents one horizontal slice of the total color spectrum represented by a cylinder. The vertical axis 10 of the tree specifies the intensity (lightness) of the beam, from nothing at the bottom (that is, black 12) through gray 14 to some maximum value 16 at the top corresponding to the brightest possible white. At each level of the tree (which corresponds to a given lightness or brightness), we draw a hue circle 18 whose circumference shows the various pure, fully saturated, monochromatic colors of the rainbow in wavelength order from red to violet. The shown Hue circle 18 represents but one slice of a cylinder going from black 12 at the bottom to the maximum value 16 or brightest value at the top. The points on a radius line from the center of the tree to some point on the circumference represent saturation via different unsaturated colors formed by mixing some amount of white from the center of the tree with some amount of the color at the end point of the line.

These color models are implemented in many computer systems for use by graphic artists when modifying images. Pink is a mixture of red and white, and the hue of the mixture is still red. Mixtures of yellow and white would produce colors that we would still call yellow, but which also might be described as “cream” white, “warm” white, etc.

Changing the colors of light fixtures in a color-capable lighting system turns static lighting scenes into dynamic light sculptures. Animated color scenes can entertain and enhance living conditions in a variety of situations. For example a set of color-capable track lights could “paint” interesting color patterns on a white wall such as a red, white and blue Fourth of July theme.

Traditionally scene animation is done using a playback mechanism. An animated or dynamic scene is authored prior to use. The authoring is done using a computer program that allows a user to program the color of various light fixtures at specific times along a timeline. This sequence is either played back directly from the computer or downloaded into a special controller. Often multiple sequences are downloaded and may be selected using a control panel. Although flexible the playback mechanism generates a repetitive sequence.

Other devices implement algorithmic color selection. For example fading sequentially through the rainbow color spectrum (Red, Yellow, Green, Cyan, Magenta). Another example is flashing through certain, pre-specified, color patterns. These color patterns may be associated with specific ideas, for example they may be colors associated with a specific holiday. However, these algorithmic selection mechanisms also generate repetitive sequences.

What is needed is a lighting scheme that is non-repetitive. What is also needed is a scheme that will allow user selection of various light fixture scene involvement regarding parameters such as fixture installation or group, color/intensity range selection, fade timing delay selection, and dwell delay selection. The present invention addresses these needs as will be explained herein.

SUMMARY

The primary aspect of the present invention is to provide a method using an algorithm to generate non-repetitive lighting sequences for themed lighting selections with lighting parameters controlled in a random manner.

Another aspect of the present invention is to provide for user range selection of lighting parameters within a selected theme.

Another aspect of the present invention is to provide for random selection of lighting within user selected parameter range(s).

Yet another aspect of the present invention is to provide for weighting or ‘biasing’ values within a selected range.

Other aspects of this invention will appear from the following description and appended claims, reference being made to the accompanying drawings forming a part of this specification wherein like reference characters designate corresponding parts in the several views.

The present invention is a lighting control method comprising:

- an algorithm using pseudo-random number generation to select parametric values for color-capable lighting system control;
- said algorithm used to generate animated scenes to fit a specified theme;
- said theme defined by a plurality of parameters including but not limited to zone(s), group(s), light fixtures selection, and a plurality of range selection for color and intensity selection, fade delay and dwell delay; and
- said parameters of color, intensity, fade, dwell, defined further by a ‘biasing’ or weighted value sub-ranges.

Figure 1:
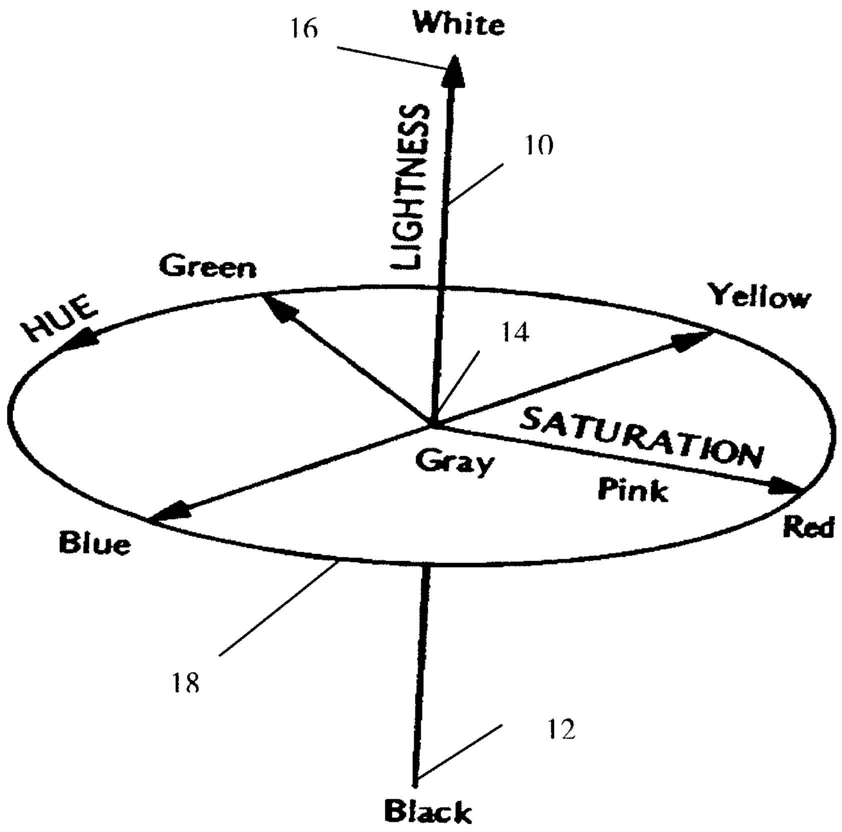
Fig. 1 (prior art)
FIG. 1 (prior art) is a three-dimensional color space showing Hue, Saturation and Lightness (Intensity).

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION

The present invention provides color selection method using a biased, pseudo-random algorithmic. The color in this specification refers to selected hue and saturation values. The present invention supports a protocol using a sophisticated addressing mechanism capable of controlling millions of light fixtures. The supported concept of zone, group, and unit is explained herein to more fully understand the use of the pseudo-random algorithm for color selection.

The address mechanism provides the capability to easily address individual lights, groups of related lights or entire zones of lights with a single command. The protocol supports the concept that groups of lights may be related. For example consider a set of wall sconces or a set of garden lights. It may be desirable to turn them all on or off with a single command. It may also be desirable to control each individually (for example to set different colors). It may also be desirable to control sub-sets with the same command (for example to paint an attractive complementary color pattern on a wall by addressing all even sconces with one color and all odd sconces with another color).

The protocol implements the addressing mechanism with the concept of zones, groups and units. A zone is a group of related light fixtures. The relation is arbitrary. It may be the set of sconces in the previous example or a set of lights in a single physical light fixture (such as a chandelier). A group is a collection of lights within a zone. Each light may belong to zero or more groups according to arbitrary conventions. Group numbers are unique within a Zone. In the previous example, all even sconces may belong to group 1 and all odd sconces may belong to group 2. Furthermore other combinations may belong to other groups, for example the first and last may belong to group 3 and all middle sconces may belong to group 4. The concept of groups within a zone allows easy scene management. A single command may target a particular group of lights, leaving all other lights unaffected. Finally each light has a unique unit address within the zone to allow for control of a single light.

The protocol transmits addresses in two formats that are understood by all receiving devices: Group and Unit. Group addresses consist of a Zone address and a Group address. Unit addresses consist of a Zone address and Unit address. The special value of '0' for an address makes that address a wildcard. A wildcard address matches all possible address for that component of the address. This mechanism gives the addressing mechanism great flexibility. The following types of light selection are easily made.

All units: Setting the Zone Address=0 and either the Group or Unit Address=0 will address all possible lights.

Entire Zone: Setting the Zone Address to a specific zone number and either the Group or Unit Address=0 will address all lights within a zone.

Zone Group: Setting the Zone Address to a specific zone number and the Group Address to a specific group will address all lights within that zone that are part of that group.

Zone Unit: Setting the Zone Address to a specific zone number and the Unit Address to a specific unit within that zone will address a single light.

Multiple Zone Group: Setting the Zone Address to 0 and the Group Address to a specific group shared by multiple zones will address all lights that are part of that group.

Multiple Zone Unit: Setting the Zone Address to 0 and the Unit Address to a specific unit will address all lights with that unit in any zone.

The present invention provides a biased, randomly selected algorithmic color selection process that improves animated color scene generation by removing the repetitive nature of current color scene generation systems and replacing it with an algorithm that may be implemented in low-cost control systems. The present invention is based on the ability of a computer to generate random or pseudo-random numbers. Random number generation is well known in prior art. As described in the Wikipedia® article "Random Number Generator":

"There are two principal methods used to generate random numbers. One measures some physical phenomenon that is expected to be random and then compensates for possible biases in the measurement process. The other uses computational algorithms that produce long sequences of apparently random results, which are in fact completely determined by a shorter initial value, known as a seed or key. The latter types are often called pseudorandom number generators."

Pseudo-random number generators (PRNGs) are well known in the art and are much simpler and less expensive to implement. Although they will eventually repeat the same sequence of numbers they are often "good enough" for a particular application that they appear to be random.

Pseudo-random number generators can automatically create long runs (for example, millions of numbers long) with good random properties but eventually the sequence repeats exactly (or the memory usage grows without bound). One of the most common PRNG is the linear congruential generator, which uses the recurrence $$X_{n+1}=(aX_n+b)\bmod m$$

to generate numbers. The maximum number of numbers the formula can produce is the modulus, m. Another example of a pseudo-random number generator referred to as "Galois LFSR" can be found in the Wikipedia article 'Linear Feedback Shift Register'.

A PRNG is used in an algorithm to generate themed lighting selections suitable for use in holiday or party lighting. The algorithm is flexible allowing for a wide range of control including color selection, fade and dwell times.

The term random number is used in this description to describe either true random numbers or pseudo-random numbers.

The present invention's algorithm applies random numbers to selecting values for a color-capable lighting system to generate animated scenes that fit a particular envisioned theme. For example, a theme could be the Christmas Holiday or Mardi Gras. For a selected theme the algorithm will select colors and fades from a predefined list that fit the criteria defining the theme. Because it uses random numbers the color changes will appear to be ever-changing with no repetition.

Controls can be implemented with selection described by way of example using select buttons as follows:

A. Theme Button: A theme button on a central controller could select the program theme or disable the program from running.

B. Address button: This button selects what Zone or Zones the program will be allowed to control. The preferred embodiment program allows control of all zones or just a specific zone.

C. Speed: This button selects the range of allowable fade and dwell times in three ranges: Fast, Medium and Slow.

Figure 3A:
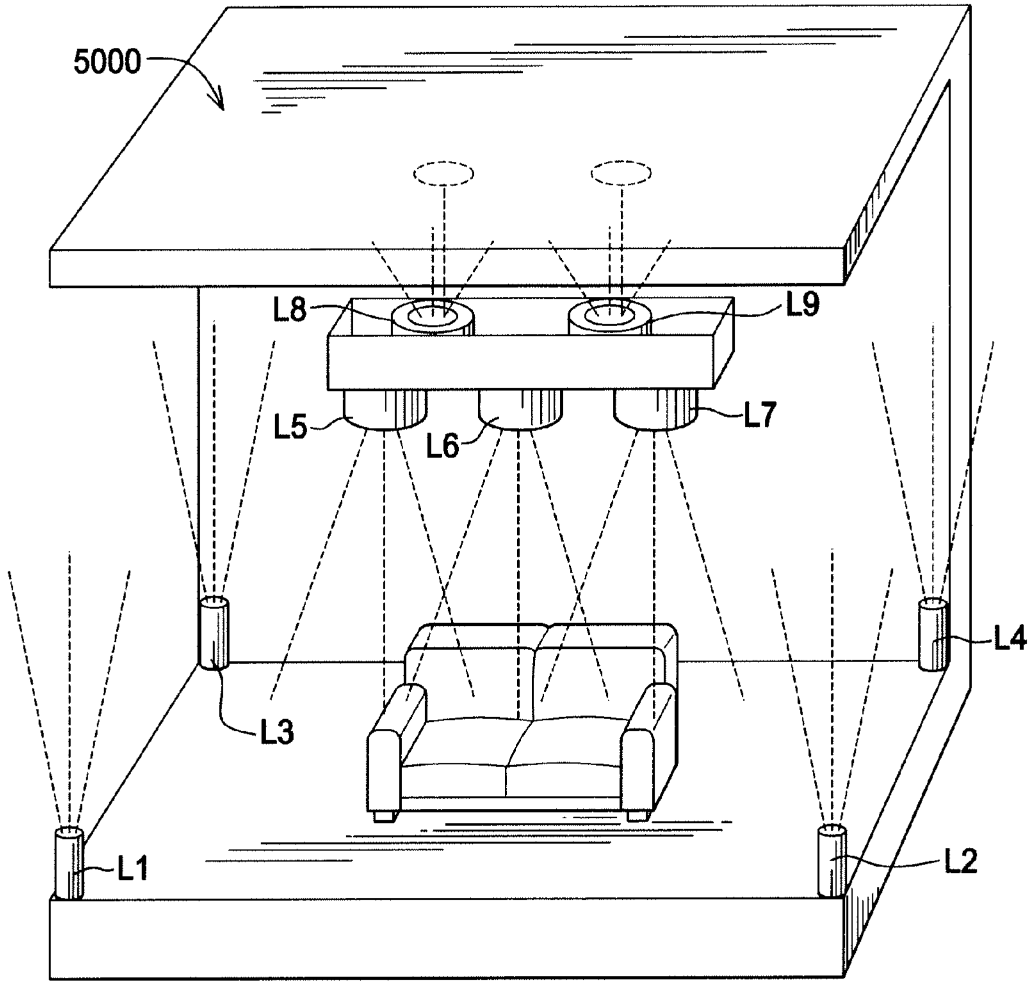
FIG. 3A is a front perspective view of an example zone containing a plurality of lighting groups with individual unit lights.
Figure 3B:
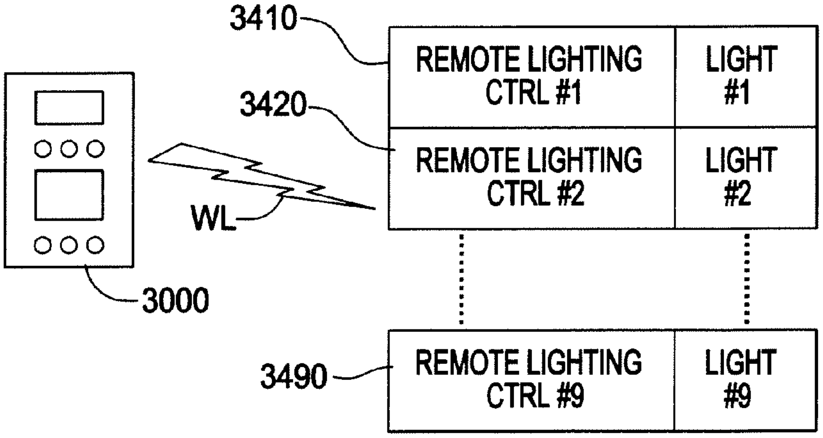
FIG. 3B is a diagram of a central remote control device sending control signals to remote controllers for the zone shown in FIG. 3A.

The above button functions can be implemented as shown in the remote control device 3000 as seen in FIG. 3B below.

It should be noted that the aforementioned embodiment is for a limited-capability handheld remote, which is given by way of example and not of limitation. The algorithm of the present invention running on a personal computer would have a much more sophisticated way of choosing what zones could partake. For example, the user could check click-boxes next to each zone in a list to indicate what lights they want controlled by the algorithm.

The user, via a set of software, can specify themes, biasing, parameter limitations within a set theme, etc.

The selected theme specifies a set of one or more color ranges that may be selected from. For example the Winter Holiday allows for shades of Red, Green and White. Each range comprises a lower and upper limit on the Hue, Saturation and Value that can be chosen. In this example for a Winter Holiday, the theme is designed to select saturated Reds and Greens so the Saturation range minimum and maximum for these color ranges are both close to 1.0 (maximum saturation).

A particular theme is defined by many parameters itself. Each parameter defining a theme may have a range. The algorithm selects randomly within each range to generate the values for the lighting system. Furthermore specific values or sub-ranges within a parameter range can be weighted so that they are more-frequently or less-frequently selected. This process is called "biasing". The selection algorithm is biased to select some values with a greater or lesser rate than others. This allows the designer of the theme to impose control over how values are selected while still allowing the random-selection mechanism to generate a wide variety of colors and other values.

Parameters that may be selected from using this algorithm include such items as:

Light Fixture Selection: Given access to a list of all available light fixtures and different light fixtures configurations available (e.g. zones, groups and light units) and a list of which light fixtures and configurations the user wishes to be controlled, the algorithm can select any combination of lights to receive selected values. This selection can be a single light fixture, a group of light fixtures, an entire zone of light fixtures or all light possible light fixtures.

Color Selection: Given a list of color selection ranges the algorithm can select specific, randomly chosen colors from with the ranges. For example, a Mardi Gras themed list of colors might contains color ranges of gold, green and purple.

Intensity Selection: Given a list of intensity selection ranges the algorithm can select specific, randomly chosen intensity values.

Fade Delay Selection: Given a list or range of fade delays, the algorithm can select the fade delay to be implemented by the selected light fixtures to fade from their current color/intensity to the next selected color/intensity.

Dwell Delay Selection: Given a list or range of dwell delays, the algorithm can select a period of time to leave a particular selection of colors and intensities in a static situation before selecting a new set of values to send to the light fixtures.

Each list or range can also have an associated bias, or selection weight, that is used to determine how possible it is to be selected or have a value selected from within it. Lists and ranges can also be associated so that certain parameter selections will be made in conjunction with other parameter selections. For example certain color selections may only be made with certain intensity selections.

An example of the algorithm can be described using the following parameter ranges and lists. The following information is described using a textual description:

Light Fixture Selection:
All Lights: 10%
Zone 1: 20%
Zone 2: 30%
Zone 3: 40%

Secondary Light Fixture Selection:
If Light Fixture Selection=All Lights
  All Lights: 5%
  One Zone: 15%
  One Group within a Zone: 45%
  One Light within a Zone: 35%
Else:
  Complete Zone: 20%
  One Group within a Zone: 45%
  One Light within a Zone: 35%

Color/Intensity Selection:
Range 1—Reds, Medium Intensities: 20%
Range 2—Reds, Medium through Bright Intensities: 20%
Range 3—Greens, Medium Intensities: 20%
Range 4—Greens, Medium through Bright Intensities: 20%
Range 5—Snow White, All Intensities: 20%

Fade Delay Selection:
Range 1—1-5 seconds: 50%
Range 2—5-30 seconds: 40%
Range 3—30-600 seconds: 10%

Dwell Delay Selection:
Range 1 (selected with Fade Range 1)—2-5 sec.
Range 2 (selected with Fade Range 2)—10-20 sec.
Range 3 (selected with Fade Range 3)—100-300 sec.

The algorithm loops through the selected parameter ranges and lists. Based on the aforementioned parameters and setting, each time through the loop it performs the following operations:

Select a maximal light fixture set: 10% of the time it will select all lights to possibly receive the subsequent commands, 20% of the time it will select Zone 1, 30% of the time it will select Zone 2 and the remainder of the time it will select Zone 3.

Select a specific address:

A. If the maximal address selection was 'All Lights' then the algorithm can select an address with one of four possible types:
  1. the All Lights address with a 5% probability;
  2. all lights in one specific zone with a 15% probability;
  3. a specific group within in specific zone with a 45% probability or;
  4. a specific unit within a specific zone with a 35% probability.

B. If the maximal address selection was a specific zone then the algorithm can select an address with one of three possible types:

1. 'all lights' in the selected zone with a 20% probability;
2. a specific group within the selected zone with a 45% probability or;
3. a specific unit within the selected zone with a 35% probability.

Select a color/intensity value. For this set of parameters a single color/intensity value is selected given the specified weighting values. Thus for Range 1—Reds, Medium Intensities have a weighted value of 20% and so on. Note that within a single range there is a uniform probability of any value being selected. Also note that, in this example, there will be a propensity to select medium intensities since they may be selected in each of the red and green color ranges.

Select a fade delay: One of the three fade ranges is selected given the specified weighting values. Then a specific fade delay is selected from a uniform distribution from within the range. In the above example for Range 2; 5-30 second fade delays are selected 40% of the time.

Select a dwell delay: A range corresponding to the selected fade delay range is selected and then a specific dwell delay is selected from a uniform distribution within the selected range. In the above example for Range 2, the dwell time would be from 10-20 seconds.

A command and address packet with the color/intensity and fade delay is sent to the selected light fixtures; that command being a fade to the new color. The algorithm waits the fade delay plus the dwell delay before starting another selection.

The above is shown by way of example and not of limitation. The example shows but one possible organization of parameter ranges and lists. A particular implementation of the algorithm may have any variety of ranges and lists. There may be more complex relationships including weighting values within a range or list of weighted ranges.

Figure 2:
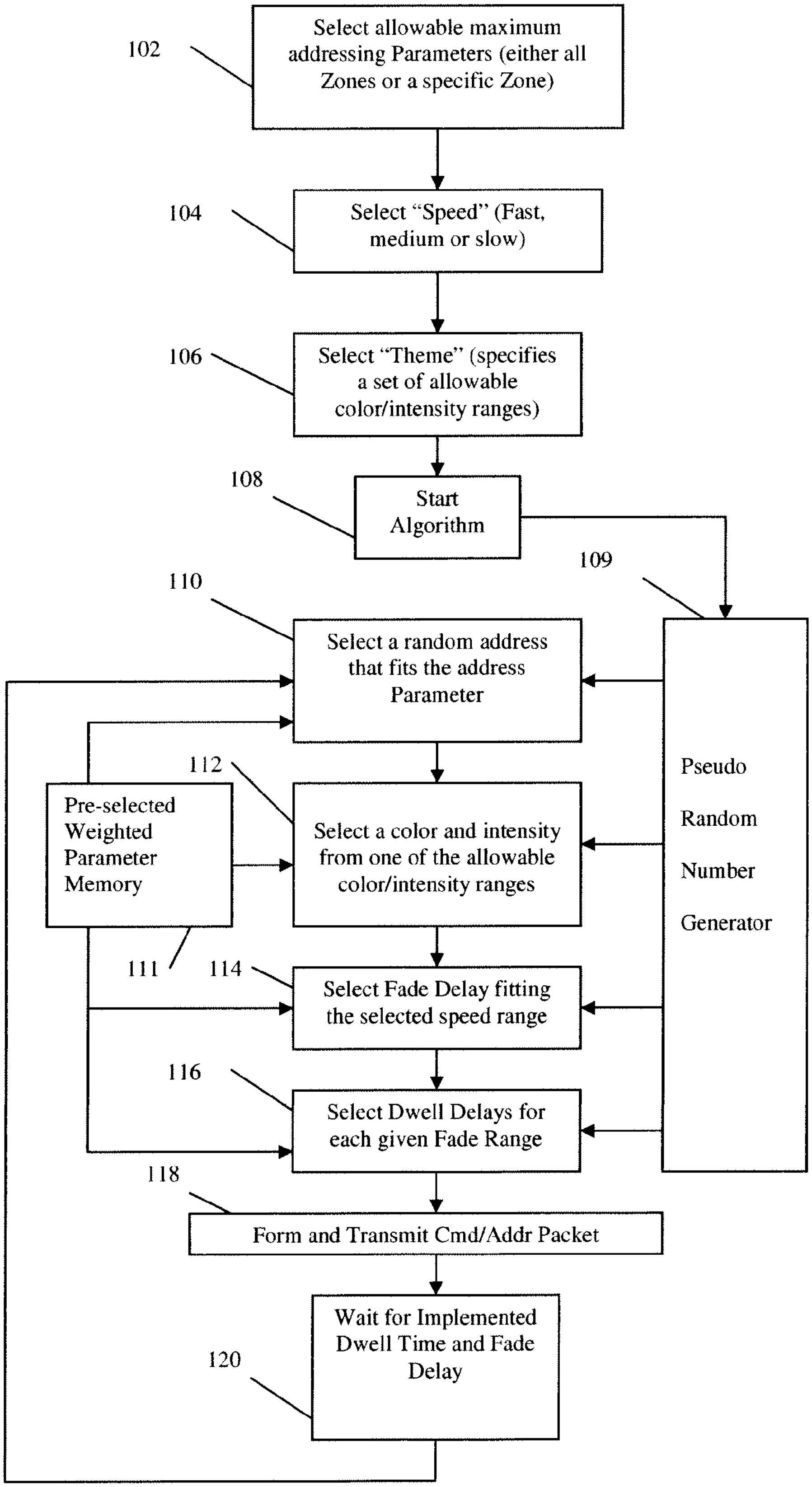
FIG. 2 is a flow chart of the pseudo-random color generation process.

FIG. 2 is a flow chart of the pseudo-random color generation process. All of the following would occur on a central lighting controller.

Once a user selects 'Program Mode' the process starts with an 'address' button in step 102. The user would first select all zones or specific zones the program will be allowed to control. The preferred embodiment program allows control of all zones or just a specific zone. It starts in the "ALL" address selection. Every time the user presses the address button, the program advances to the next zone that the controller has been programmed to know about in a sequence; (ALL->Z1->Z2->Z3 . . . ->ALL).

The algorithm can generate 1 of 4 kinds of addresses each time through the loop: ALL, Zone, Group or Unit. The 'ALL' address is for all controllable lights (Zone=0, Group=0). It can only be generated if the user allows the algorithm to control all lights. Each time through the loop the algorithm will choose a legal address/type.

If 'ALL' then the addresses can be:

All=>Zone=0, Group=0

Zone=>Zone=Any valid zone, Group=0

Group=>Zone=Any valid zone, Group=Any valid group within that zone

Unit=>Zone=Any valid zone, Unit=Any valid group within that zone.

If a specific zone has been chosen then the addresses can be:

Whole Zone=>Zone=the selected zone, Group=0;

Group=>Zone=the selected zone, Group=Any valid group within that zone;

Unit=>the selected zone, Unit=Any valid unit within that zone

Next, in step 104, the user would select one of three speeds via a 'Speed Select' button. This button selects the range of allowable fade and dwell times in three ranges: Fast, Medium and Slow. Pressing the button cycles through the three possibilities. For example, the Fast speed may select fade times between 1-5 seconds and dwell times between 5-10 seconds. The Slow speed may select fade times between 1-5 minutes and dwell times may select between 5-10 minutes, for example.

Next, in step 106, the user would select a Theme via a 'Theme Select' button. This would select the program theme or disable the program from running. It would start off in the "OFF" position. Every time the user presses it, the theme can be changed to the next theme, for example P1/"Winter Holiday", P2/"Spring", P3/"Summer", P4/"Fall", etc, cycling around through "OFF". The theme name can be briefly displayed in a display above the button and then the field above the theme button would show the program number (e.g. P1). Then it picks a color from within one of the ranges associated with the theme. For example in the Winter Holiday theme, it first picks one of the three ranges (red, green or white). Then it picks a color within that range. Each range may be weighted to encourage more selections of certain colors.

Once the user enables the program by picking a theme the algorithm starts to work, step 108. In step 109 a pseudo-random number generator sends one or more individually generated random numbers to randomly select each of the following; an address (step 110), a color and intensity (step 112), a fade delay (step 114), and a dwell delay (step 116). Each address, color/intensity, fade delay, and dwell delay is assigned aforementioned pre-selected weighting parameters from a pre-selected weighting parameter memory 111.

The algorithm first picks a random address, in step 110, that fits the aforementioned address limitations (ALL or a specific Zone).

Each address type has a different possibility of being chosen based on the weight or bias. For example it is generally more pleasing to see groups of lights change than to see whole zones or single units change. So a weight is assigned to each possible address type, say 45% to group addresses, 35% to unit addresses and 20% to zone addresses. The algorithm will, on average, select a group address 45% of the time—although any two or more consecutive selections can be the same addressing type.

Next, in step 112, a range within the selected theme is randomly selected and then from within that range a specific color and intensity is randomly selected. In step 114 a random fade delay is selected for the given fade range. Then in step 116, random dwell delays are selected for each given fade range. In step 118, the transmit command/address packet is formed from the pseudo-randomly selected parameters and sent to light fixture controllers. An example of a command and address packet is described below in FIG. 4. Next in step 120, once the dwell time and fade delay has transpired, the next random address is selected via returning to step 110.

The present invention thus provides animation of color capable lights via use of a computer algorithm instead of a fixed set of patterns, as used in the prior art, resulting in essentially an infinite number of color combinations. The algorithm is constrained to making choices that "make sense" by biasing and limiting the selection possibilities. Random numbers provide the basis of infinite possibilities. The biases constrain the random numbers to values that fit the selection criteria.

FIG. 3A is a front perspective view of an example room 5000 containing a plurality of lighting zones with individual unit lights. Shown are two separate zones with individual lights as follows:

Zone #1 contains four individual lights L1, L2, L3, L4;
Zone #2 contains five individual lights L5, L6, L7; L8, L9.
L5, L6, L7 are in Group #1 in Zone #2; and
L8, L9 are in Group #2 in Zone #2.

In this manner the lighting effects pointing to the ceiling would easily be changed independent of the lighting effects pointing down. It should be noted that there could be other group assignments in both zones. Each lighting controller recognizing its respective assigned zone address, group address and unit address for controlling its fixture.

FIG. 3B is a diagram of a central remote control device sending control signals via packets to remote light controllers for the zone shown in FIG. 3A. Thus, handheld remote control unit 3000 would send commands over wireless link WL to the individual remote light controllers for control of entire zones, a particular group in a zone or individual lights within a zone. Each remote light controller monitors its address and will keep each individual light under its control to the last instructed value until a new packet is received for its address with a command required a change to the lights present state. Each remote light controller would decode received protocol packets to see if their zone, group or light address were enclosed and respond accordingly. It should be noted that the central controller 3000 would not require knowledge of how to control lighting but only send a command as to what is required at which time the remote light controllers would act accordingly.

Using the pseudo-random algorithm of the present invention would allow color changes to appear to be ever-changing with no repetition.

As an example, if the stage scene were to be set with the following parameters for pseudo-random color generation:

- Light Fixture Selection:
  - All lights: 10%
  - Zone 1: 60%
    - All Lights
  - Zone 2: 30%
    - Group 1 (L5, L6, L7): 35%
    - Group 2 (L8, L9): 65%

Thus, in the above settings, all lights L1 through L9 would be changed simultaneously 10% of the time; One or all Zone 1 lights would be changed 60% of the time; One, a group or all Zone 2 lights would be changed 30%. When a group within Zone 2 was selected, Group 1 would be selected 35% of the time, and Group 2 would be selected 65% of the time. It should be noted than any light could belong to any grouping.

Along with fixture addressing and weights per above, the other parameters would be selected. Example as follows:

- Color/Intensity Selection:
  - Range 1—Reds, Medium Intensities: 20%
  - Range 2—Reds, Medium through Bright Intensities: 20%
  - Range 3—Greens, Medium Intensities: 20%
  - Range 4—Greens, Medium through Bright Intensities: 20%
  - Range 5—Snow White, All Intensities: 20%
- Fade Delay Selection:
  - Range 1—1-5 seconds: 50%
  - Range 2—5-30 seconds: 40%
  - Range 3—30-600 seconds: 10%
- Dwell Delay Selection:
  - Range 1 (selected w Fade Range 1)—2-5 sec.
  - Range 2 (selected w Fade Range 2)—10-20 sec.
  - Range 3 (selected w Fade Range 3)—100-300 sec.

The above selections would be placed into memory and when the algorithm would start it would randomly control stage 5000 to the selected parameters. The random process would generate non-repetitive sequences for this particular layout. It should be noted that FIG. 2 is shown by way of example and not of limitation. Many other implementations having more complex relationships and/or control mechanisms are possible.

Figure 4:
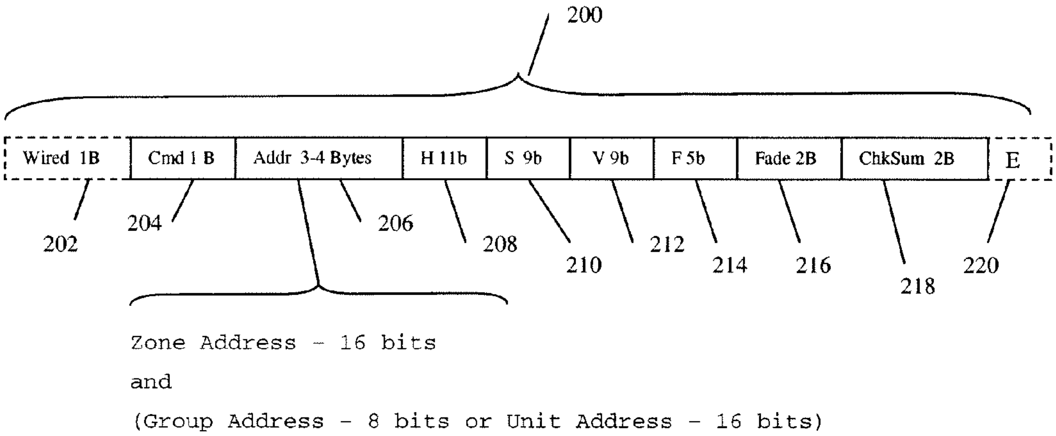
FIG. 4 is a schematic representation of the transmitted packet structure of the preferred embodiment of the present invention.

FIG. 4 is a schematic representation of the transmitted packet structure 200 of the preferred embodiment of the present invention. In the preferred embodiment the maximum size of a transmitted packet is 16 Bytes. The packet may be transmitted used wired or wireless interfaces. If the central controller is hard wired, then a first byte 202 is a 'start of packet' byte. The command byte 204 is extendable allowing addition of future commands. It contains commands such as:

set HSV color group address
set HSV color unit address
Fade HSV color group address
Fade HSV color unit address It could also present a query command to a remote lighting controller asking for the present color of remote units.

Two or three address bytes 206 control addressing schemes for zone, groups and unit fixtures. Color is specified with an 11-bit Hue field 208, a 9-bit Saturation field 210, a 9-bit Intensity field 212 and a 5-bit flag field 214. The 5-bit flag field 214 allows the central controller to issue commands changing only part of the color or intensity. For example the controller can set up different intensities and/or saturation levels for a number of light fixtures and then modify only the hue. The preferred embodiment of the present invention utilizes the 5-bit flag field 214 for:

- Enable Hue
- Enable Saturation
- Enable Intensity
- Scale Intensity (allows a master control to adjust the intensity level of light fixtures, as a percentage of their current brightness)
- Delta Values (allows a master controller to change the current value by a delta amount)

2-Byte field 216 is used for 'fade time' control. Fade time can be controlled in 0.1 second increments. This allows a fade command to cause selected light fixtures to change to a new color over a specified period of time. Finally a 2-Byte checksum field 218 ensures data integrity. It should be noted that a wired interface uses a 1-byte checksum, whereas the wireless interface uses a 2-byte checksum] In addition the protocol allows for an extension of device types and commands to be added later, field 220. Field 220 is the end-of-packet mark for the wired interface. The packet length for other packet types is set by the command byte.

A decorative lighting control method comprising the steps of:

a) forming in a central controller a pseudo-random number generation algorithm which independently varies a plurality of parametric values for the color-capable lighting system central controller;
b) creating a color capable lighting system, wherein each individual color capable light fixture has a unique address for its remote controller;
c) selecting a range for fade times and dwell times;
d) selecting a set of allowable colors and/or range of intensities;
e) selecting a range of light fixture and/or light group addresses;

f) using the algorithm to randomly select a plurality of addresses for light fixtures and/or light groups;

g) using the algorithm to randomly select a set of allowable colors and intensities;

h) using the algorithm to randomly select a fade time;

i) using the algorithm to randomly select a dwell time;

j) forming a data packet in the central controller containing all of the above noted parameters including address, fade time, dwell time, color and intensity;

k) transmitting said data packet to all of the light fixture controllers;

l) waiting for a period of time equal to or greater than the last dwell plus fade times; and m) repeating steps f through l a desired number of times.

Although the present invention has been described with reference to preferred embodiments, numerous modifications and variations can be made and still the result will come within the scope of the invention. No limitation with respect to the specific embodiments disclosed herein is intended or should be inferred. Each apparatus embodiment described herein has numerous equivalents.

I claim:

1. A decorative lighting control method comprising the steps of :

a- forming in a central controller a control algorithm having a pseudo-random number generation algorithm (PRNG) which independently varies a plurality of parametric values for the central controller, said plurality of parametric values comprising a color, a color saturation, a color intensity, a fade time, and an address, said address for a module comprising a zone and a group or a zone and a unit;

b- creating a color capable lighting system, including the central controller and one or more modules, the modules being light fixtures, wherein each individual light fixture is controlled by a light fixture controller capable of receiving and reading data packets, said data packets comprising parametric values for an address and a color, a color saturation, a color intensity and a fade time parameter;

c- selecting a set of allowable colors, color saturations, color intensities, and fade times defining a theme using the central controller;

d- selecting a range of addresses to participate in the theme using the central controller;

e- using the PRNG to randomly generate a plurality of address sets from within the range selected to participate in the theme;

f- using the PRNG to randomly generate a plurality of color parameter sets from among the allowable colors, independently from addresses, that define the them as well as randomly generated color saturations, color intensities, and changing fade times;

g- forming a data packet in the central controller containing an address set from the parametric values created in steps e and f, and containing a color contained in a color set, a color saturation, a color intensity, and a fade time, all parameters created in steps e and f;

h- broadcasting said data packet to all light fixture controllers in the color capable lighting system;

i- modifying the attributes of each light fixture having a light fixture controller with an address that matches the address value in the broadcast data packet, such light fixture attributes being modified to conform to the parametric values contained in the data packet received by the light fixture controller; and j- repeating steps e through i hereof.

2. The method of claim 1, further comprising the steps of:

a- adding values for dwell time to the theme;

b- selecting allowable ranges of dwell time;

c- using the PRNG to randomly generate a parametric value for dwell time within the selected allowable ranges for same; and d- using the PRNG to randomly generate a parametric value for dwell time within the selected allowable ranges for same and waiting for the value of the dwell time plus fade time before engaging in step j claim 1.

3. The method of claim 1, further comprising the steps of:

a- modifying the control algorithm to use the PRNG to form two or more subsets from an allowable range for said parametric values for an address and a color parameter;

b- assigning a bias to each such subset, each said bias being a probability that a value within the subset will be selected from among the allowable range of values for said parametric value; and c- using the PRNG to randomly generate a plurality of values for said parametric value, which plurality of values exhibits the biases assigned to the subsets within the allowable range of said parametric value.

4. The method of claim 3, further comprising the steps of:

a- repeating steps a and b of claim in a manner that creates two or more alternative groups of subsets within an allowable range of values for said parametric values for an address and a color, such that each alternative group of subsets is subject to an unique set of biases;

b- providing to the central controller, logic for selecting among the alternative groups of subsets for a parametric value, which logic can vary said selection over time; and c- using the PRNG to randomly generate a plurality of values for said parametric value, which plurality of values are within the allowable range of values for said parametric value and which plurality of values exhibit the biases assigned to the group of subsets with biases then selected.

5. A decorative lighting control system comprising:

a- a-means for forming in a central controller a control algorithm having a pseudo-random number generation algorithm (PRNG) which independently varies a plurality of parametric values comprising a color, a color saturation, a color intensity, a fade time, and an address, said address for a module comprising a zone and a group or a zone and a unit;

b- means for creating a color capable lighting system, including the central controller and one or more modules, said modules being light fixtures wherein each individual light fixture is controlled by a light fixture capable of receiving and reading data packets, said data packets comprising parametric values for an address and a color, a color saturation, a color intensity, and a fade time, parameter;

c- means for selecting a set of allowable colors, color saturations, color intensities, and fade times defining a theme using the central controller;

d- means for selecting a range of addresses to participate in the theme using the central controller;

e- means for using the PRNG to randomly generate a plurality of address sets from within the range selected to participate in the theme;

f- means for using the PRNG to randomly generate a plurality of color, color saturations, color intensities, and changing fade time parameter sets independently from addresses, from among the allowable color, color saturation, color intensity, and fade time parameter sets that define the theme;

g- means for forming data packet in the central controller containing an address set from the parametric values created in element e, and containing a color, color saturation, color intensity, and fade time parameter created in element f;

h- means for broadcasting said data packet to all light fixture controllers in the color capable lighting system;

i- means for modifying the attributes of each light fixture having a light fixture controller with an address that matches the address value in the broadcast data packet, such light fixture attributes being modified to conform to the parametric values contained in the data packet received by the light fixture controller; and j- means for repeating steps e through i hereof.

6. The system of claim 5, wherein the parametric values and the data packets for the central controller also comprise values for dwell time, further comprising the steps of:

a- means for selecting allowable ranges of dwell time and adding them to the theme;

c- further comprising the step of using the PRNG to randomly generate a parametric value for dwell time within the selected allowable ranges for same and waiting for the value of the dwell time plus fade time before engaging in step j of claim 5.

7. The system of claim 5, further comprising:

a- means for forming two or more subsets from an allowable range for said parametric values for an address and a color, color saturation, color intensity, and/or fade time parameter;

b- means for assigning a bias to each such subset, each said bias being a probability that a value within the subset will be selected from among the allowable range of values for said parametric value; and c- means for using the PRNG to randomly generate a plurality of values for said parametric value, which plurality of values exhibits the biases assigned to the subsets within the allowable range of said parametric value.

8. The system of claim 7, further comprising:

a- means for repeating steps a and b of claim 7 in a manner that creates two or more alternative groups of subsets within an allowable range of values for said parametric values for an address and a color, color saturation, color intensity, and/or fade time such that each alternative group of subsets is subject to an unique set of biases;

b- means for providing to the central controller, logic for selecting among the alternative groups of subsets for a parametric value, which logic can vary said selection over time;

c- means for using the PRNG to randomly generate a plurality of values for said parametric value, which plurality of values are within the allowable range of values for said parametric value and which plurality of values exhibit the biases assigned to the group of subsets with biases then selected.

9. A lighting control system comprising:

a- a central controller having a pseudo-random number generation algorithm (PRNG) capable of generating parametric values in a pseudo-random fashion;

b- a plurality of parametric values corresponding to light fixture attributes, said parametric values for color, color saturation, color intensity, fade time, and address, said address for a module comprising values for a zone, and one or more groups or a single module, and said parametric values being generated by said central controller;

c- a plurality of light fixtures, each light fixture being controlled by a light fixture controller having an unique address, said light fixture controller being capable of reading parametric values;

d- means for setting an allowable range for one or more parametric values, said allowable range or ranges comprising a color theme, and a zone identity and /or group identity and/or unit identity to execute said color theme;

e- means for generating pseudo-random parametric values within any allowable range or ranges for said parametric values comprising said color theme and identities;

f- means for broadcasting parametric values from said central controller to a plurality of light fixture controllers;

g- means for modifying one or more light fixture attributes including color, color saturation, color intensity, and fade time in one or more light fixtures having an address that matches a broadcast address, said modification or modifications to light fixtures attributes matching parametric values broadcast with the broadcast address from the central controller to the plurality of light fixture controllers; and h- means for repeating steps e through g hereof.

10. The system of claim 9, wherein the parametric values also comprise values for dwell time.

11. The system of claim 10, wherein a light fixture controller waits for a period of time equal to or greater than the dwell time plus fade time of the last broadcast with said light fixture controller's address before modifying any attributes of the lighting fixture controlled by said light fixture controller.

12. The system of claim 9, further comprising:

a- means for dividing an allowable range of parametric values into a group of subsets, each subset within said group having a bias, said bias being a probability that said parametric value will fall within said subset; and b- means for generating pseudo-random parametric values that conform to the biases of said subsets.

13. The system of claim 9, further comprising a- means for dividing an allowable range of parametric values into a plurality of group of subsets, each group of subsets having an unique set of biases;

b- means for selecting from among groups of subsets for a parametric value; and c- means for generating pseudo-random parametric values that conform to the biases of the subset selected from among said groups of subsets.

14. The system of claim 9, wherein the parametric values are broadcast in data packets.

15. The system of claim 14, wherein said data packets comprise values for whether the data packet is transmitted over a wired or wireless interface, whether each parametric value should be enabled or disabled, incremental changes in parametric values, checksum or other error control data and the beginning and end of a packet.

* * * * *